(12) United States Patent
Kray et al.

(10) Patent No.: US 12,460,549 B1
(45) Date of Patent: Nov. 4, 2025

(54) PITCH-CONTROLLED BLADE RETENTION COLLAR

(71) Applicant: General Electric Company, Evendale, OH (US)

(72) Inventors: Nicholas J. Kray, Evendale, OH (US); Arthur W. Sibbach, Boxford, MA (US); Shawn P. Riley, Evendale, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 19/224,336

(22) Filed: May 30, 2025

(51) Int. Cl.
F01D 5/30 (2006.01)

(52) U.S. Cl.
CPC ...... F01D 5/3007 (2013.01); *F05D 2220/323* (2013.01)

(58) Field of Classification Search
CPC ........ F01D 5/30; F01D 5/3007; F01D 5/3023; F01D 5/32; F05D 2220/323
See application file for complete search history.

(56) References Cited

U.S. PATENT DOCUMENTS

| | | | |
|---|---|---|---|
| 3,720,060 A | 3/1973 | Davies et al. | |
| 4,512,718 A * | 4/1985 | Stargardter | F04D 29/324 415/181 |
| 8,123,471 B2 | 2/2012 | Mielke et al. | |
| 9,068,574 B2 | 6/2015 | Boston et al. | |
| 9,884,675 B2 | 2/2018 | Curlier et al. | |
| 10,100,653 B2 | 10/2018 | Niergarth et al. | |
| 10,221,706 B2 | 3/2019 | Niergarth et al. | |
| 10,287,902 B2 | 5/2019 | Sak et al. | |
| 10,364,020 B2 | 7/2019 | Curnock et al. | |
| 11,118,464 B2 | 9/2021 | Perez | |
| 12,078,072 B2 | 9/2024 | Levisse et al. | |
| 2010/0322775 A1 * | 12/2010 | Surken | F01D 5/3007 416/224 |
| 2014/0219807 A1 * | 8/2014 | Lattanzio | F01D 5/3007 416/220 R |
| 2018/0335051 A1 * | 11/2018 | Lurie | F04D 29/542 |
| 2020/0362713 A1 * | 11/2020 | Bertini | F01D 5/146 |
| 2021/0108518 A1 * | 4/2021 | Kray | F01D 5/30 |
| 2021/0222575 A1 * | 7/2021 | Breeze-Stringfellow | F01D 25/12 |
| 2023/0079110 A1 | 3/2023 | Lima | |
| 2024/0044253 A1 * | 2/2024 | Kray | F02K 3/06 |

* cited by examiner

*Primary Examiner* — Elton K Wong
(74) *Attorney, Agent, or Firm* — Hanley, Flight & Zimmerman, LLC (57) ABSTRACT

Collars to retain multiple fan blades for use with an aircraft engine are disclosed herein. An example gas turbine engine includes a plurality of fan blades and a collar coupled to the plurality of fan blades. The collar includes a first mating piece and a second mating piece coupled to the first mating piece. The first and second mating pieces define an opening configured to receive a first root of a first fan blade of the plurality of fan blades, and the first and second mating pieces define a slot to retain a second root of a second fan blade of the plurality of fan blades.

20 Claims, 9 Drawing Sheets

PITCH-CONTROLLED BLADE RETENTION COLLAR

FIELD OF THE DISCLOSURE

This disclosure relates generally to fan blades and, more particularly, to pitch-controlled blade retention mechanisms.

BACKGROUND

A gas turbine engine generally includes, in serial flow order, an inlet section, a compressor section, a combustion section, a turbine section, and an exhaust section. In operation, a fan section draws air into the inlet section. The air flows to the compressor section where one or more axial compressors progressively compress the air until it reaches the combustion section, thereby creating combustion gases. The combustion gases flow from the combustion section through a hot gas path defined within the turbine section and then exit the turbine section via the exhaust section. The fan section generally includes multiple pitch-controlled fan blades rotatable about a pitch axis.

In general, the same reference numbers will be used throughout the drawing(s) and accompanying written description to refer to the same or like parts. The figures are not necessarily to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

DETAILED DESCRIPTION

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized. The following detailed description is, therefore, provided to describe example implementations and not to be taken limiting on the scope of the subject matter described in this disclosure. Certain features from different aspects of the following description may be combined to form yet new aspects of the subject matter discussed below.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3)

at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by (e.g., the same entity or object). Additionally, although individual features may be included in different examples or claims, these may possibly be combined, and the inclusion in different examples or claims does not imply that a combination of features is not feasible and/or advantageous.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified herein.

The terms "forward" and "aft" refer to relative positions within a gas turbine engine or vehicle and refer to the normal operational attitude of the gas turbine engine or vehicle. For example, with regard to a gas turbine engine, forward refers to a position relatively closer to the nose of an aircraft and aft refers to a position relatively closer to a tail of the aircraft.

During operation of an aircraft, foreign object debris (FOD) hazards (e.g., bird strikes) can damage fan blades of the aircraft's engines. FOD can also pass through the fan section of the aircraft, limiting or blocking the flow of air into the engine's compressors. Limited air flow to the compressors can adversely affect the performance of the engines by increasing the power required to provide a sufficient amount of compressed air to a combustion section of the engine. Disclosed herein are example methods and apparatus that enable retention of multiple fan blades on a collar (also referred to as a button, a blade collar, a blade retention collar, etc.). The inclusion of additional fan blades on the collar provides additional air flow to the compressor sections of an associated aircraft engine. Furthermore, the additional fan blades deflect, dislodge, divide, and/or otherwise expel FOD from the fan section and/or sever or cut FOD into smaller pieces that are less likely to limit or block air flow at an engine inlet. Disclosed herein are example methods and apparatus that enable absorption of FOD impact forces. The inclusion of structures that absorb FOD impact forces provides mitigation of damage to fan blades caused by FOD.

Figure 1:
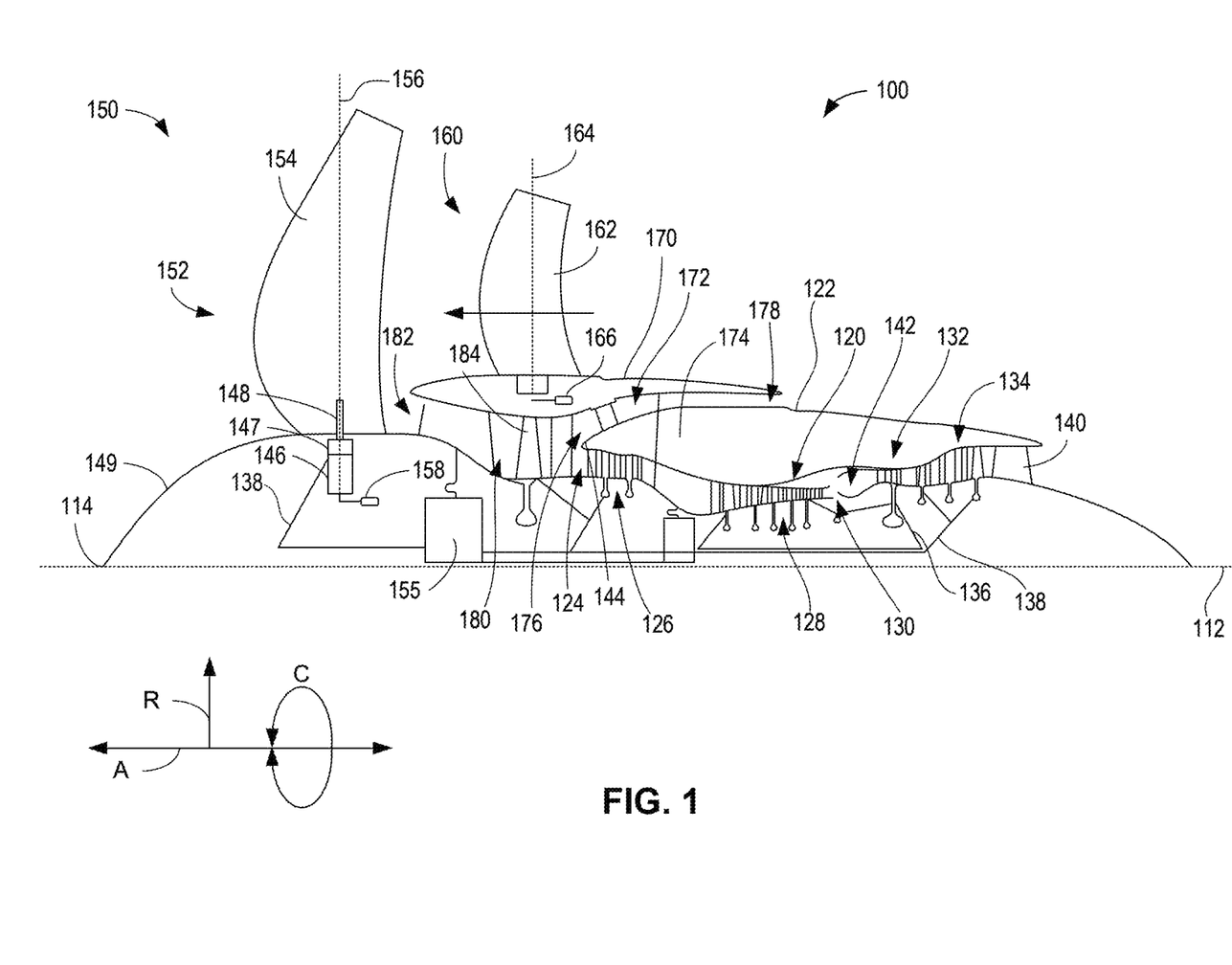
FIG. 1 is a schematic cross-sectional view of an example open-rotor engine in which examples disclosed herein may be implemented.

FIG. 1 is a schematic cross-sectional view of an example open-rotor turbine engine according to the present disclosure. Particularly, FIG. 1 illustrates an aviation three-stream turbine engine herein referred to as "three-stream engine 100". The three-stream engine 100 of FIG. 1 can be mounted to an aerial vehicle, such as a fixed-wing aircraft, and can produce thrust for propulsion of the aerial vehicle. The architecture of the three-stream engine 100 provides three distinct streams of thrust-producing airflow during operation. The three-stream engine 100 includes a fan that is not ducted by a nacelle or cowl, such that it may be referred to herein as an "unducted fan," or the three-stream engine 100 may be referred to as an "unducted engine." While the engine of FIG. 1 is a three-stream engine, the novel structures disclosed herein may be implemented in other turbine engines, such as a two-stream engine.

For reference, the three-stream engine 100 defines an axial direction A, a radial direction R, and a circumferential direction C. Moreover, the three-stream engine 100 defines an axial centerline or first longitudinal axis 112 that extends along the axial direction A. In general, the axial direction A extends parallel to the first longitudinal axis 112, the radial direction R extends outward from and inward to the first longitudinal axis 112 in a direction orthogonal to the axial direction A, and the circumferential direction extends three hundred sixty degrees (360°) around the first longitudinal axis 112. The three-stream engine 100 extends between a forward end 114 and an aft end 116 (e.g., along the axial direction A).

The three-stream engine 100 includes a core engine 120 and a fan section 150 positioned upstream thereof. Generally, the core engine 120 includes, in serial flow order, a compressor section, a combustion section, a turbine section, and an exhaust section. Particularly, as shown in FIG. 1, the core engine 120 includes a core cowl 122 that defines an annular core inlet 124. The core cowl 122 further encloses a low-pressure system and a high-pressure system. In certain examples, the core cowl 122 may enclose and support a booster or low-pressure (LP) compressor 126 for pressurizing the air that enters the core engine 120 through core inlet 124. A high-pressure (HP), multi-stage, axial-flow compressor 128 receives pressurized air from the LP compressor 126 and further increases the pressure of the air. The pressurized air stream flows downstream to a combustor 130 where fuel is injected into the pressurized air stream and ignited to raise the temperature and energy level of the pressurized air. It will be appreciated that as used herein, the terms "high/low-speed" and "high/low-pressure" are used with respect to the high-pressure/high-speed system and low-pressure/low-speed system interchangeably. Further, it will be appreciated that the terms "high" and "low" are used in this same context to distinguish the two systems and are not meant to imply any absolute speed or pressure values.

The high energy combustion products flow from the combustor 130 downstream to a high-pressure turbine 132. The high-pressure turbine 132 drives the HP compressor 128 through a high-pressure (HP) shaft 136. In this regard, the high-pressure turbine 132 is drivingly coupled with the HP compressor 128. The high energy combustion products then flow to a low-pressure turbine 134. The low-pressure turbine 134 drives the LP compressor 126 and components of the fan section 150 through a low-pressure shaft 138. In this regard, the low-pressure turbine 134 is drivingly coupled with the LP compressor 126 and components of the fan section 150. The low-pressure shaft 138 is coaxial with the HP shaft 136 in this example. After driving each of the turbines 132, 134, the combustion products exit the core engine 120 through a core exhaust nozzle 140 to produce propulsive thrust. Accordingly, the core engine 120 defines a core flow path or core duct 142 that extends between the core inlet 124 and the core exhaust nozzle 140. The core duct 142 is an annular duct positioned generally inward of the core cowl 122 along the radial direction R.

The fan section 150 includes a fan 152, which is the primary fan in this example. For the depicted example of FIG. 1, the fan 152 is an open-rotor or unducted fan. However, in other examples, the fan 152 may be ducted (e.g., by a fan casing or nacelle circumferentially surrounding the fan 152). As depicted, the fan 152 includes an array of fan blades 154 (only one shown in FIG. 1). The fan blades 154 are rotatable (e.g., about the first longitudinal axis 112). As noted above, the fan 152 is drivingly coupled with the low-pressure turbine 134 via the low-pressure shaft 138. The fan 152 can be directly coupled with the low-pressure shaft 138 (e.g., in a direct-drive configuration). Optionally, as shown in FIG. 1, the fan 152 can be coupled with the low-pressure shaft 138 via a speed reduction gearbox 155 (e.g., in an indirect-drive or geared-drive configuration).

Each fan blade 154 has a root and a tip and a span defined therebetween. Each of the fan blades 154 are coupled at their respective roots to trunnions 146 (only one shown in FIG. 1). In particular, the fan blades 154 are coupled to collars 147 of the trunnions 146 via respective spars 148 (only one shown in FIG. 1). The spars 148 are coupled to the respective blades 154 within the interiors of the fan blades 154. The collars 147 can be implemented with the novel structures disclosed herein and are described further below. The trunnions 146 are covered by a hub 149 that is aerodynamically contoured to promote airflow through the fan blades 154. Moreover, the trunnions 146 are rotatably mounted within the hub 149. Each fan blade 154, being attached to the corresponding trunnion 146 by the root, are rotatable about a respective central blade axis 156 (e.g., in unison with one another). This rotation can be used to control the pitch of the fan blades 154. One or more actuators 158 can be controlled to pitch the fan blades 154 about their respective central blade axis 156 (e.g., via the trunnions 146).

The fan section 150 further includes a fan outlet guide vane array 160 that includes fan outlet guide vanes 162 (only one shown in FIG. 1) disposed around the first longitudinal axis 112. For this example, the fan outlet guide vanes 162 are not rotatable about the first longitudinal axis 112. Each fan outlet guide vane 162 has a root and a tip and a span defined therebetween. The fan outlet guide vanes 162 may be unshrouded as shown in FIG. 1 or may be shrouded (e.g., by an annular shroud spaced outward from the tips of the fan outlet guide vanes 162 along the radial direction R). Each fan outlet guide vane 162 defines a central blade axis 164. For this example, each fan outlet guide vane 162 of the fan outlet guide vane array 160 is rotatable about its respective central blade axis 164 (e.g., in unison with one another). One or more actuators 166 can be controlled to pitch the fan outlet guide vane 162 about their respective central blade axis 164. However, in other examples, each fan outlet guide vane 162 may be fixed or unable to be pitched about its central blade axis 164. The fan outlet guide vanes 162 are mounted to a fan cowl 170.

As shown in FIG. 1, in addition to the fan 152, which is unducted, a ducted fan 184 is included aft of the fan 152, such that the three-stream engine 100 includes both a ducted fan and an unducted fan that both serve to generate thrust through the movement of air without passage through core engine 120. The ducted fan 184 is shown at about the same axial location as the fan outlet guide vane 162, and radially inward of the fan outlet guide vane 162. Alternatively, the ducted fan 184 may be between the fan outlet guide vane 162 and core duct 142 or be farther forward of the fan outlet guide vane 162. The ducted fan 184 may be driven by the low-pressure turbine 134 (e.g., coupled to the low-pressure shaft 138), or by any other suitable source of rotation, and may serve as the first stage of booster or may be operated separately.

The fan cowl 170 annularly encases at least a portion of the core cowl 122 and is generally positioned outward of the core cowl 122 along the radial direction R. Particularly, a downstream section of the fan cowl 170 extends over a forward portion of the core cowl 122 to define a fan flow path or fan duct 172. Incoming air may enter through the fan duct 172 through a fan duct inlet 176 and may exit through a fan exhaust nozzle 178 to produce propulsive thrust. The fan duct 172 is an annular duct positioned generally outward of the core duct 142 along the radial direction R. The stationary struts 174 may each be aerodynamically contoured to direct air flowing thereby. In some examples, other struts are provided in addition to the stationary struts 174 to connect and support the fan cowl 170 or core cowl 122. In many examples, the fan duct 172 and the core cowl 122 may at least partially co-extend (generally axially) on opposite sides (e.g., opposite radial sides) of the core cowl 122. For example, the fan duct 172 and the core cowl 122 may each extend directly from a leading edge 144 of the core cowl 122 and may partially co-extend generally axially on opposite radial sides of the core cowl 122.

The three-stream engine 100 also defines or includes an inlet duct 180. The inlet duct 180 extends between an engine inlet 182 and the core inlet 124/fan duct inlet 176. The engine inlet 182 is defined generally at the forward end of the fan cowl 170 and is positioned between the fan 152 and the fan outlet guide vane array 160 along the axial direction A. The inlet duct 180 is an annular duct that is positioned inward of the fan cowl 170 along the radial direction R. Air flowing downstream along the inlet duct 180 is split, not necessarily evenly, into the core duct 142 and the fan duct 172 by a splitter or the leading edge 144 of the core cowl 122. The inlet duct 180 is wider than the core duct 142 along the radial direction R. The inlet duct 180 is also wider than the fan duct 172 along the radial direction R.

During operation of the aircraft, FOD hazards can impact the fan section 150. In some examples, one or more of the fan blades 154 can become damaged upon contact with FOD. In some examples, FOD can pass through the fan section 150 to limit or block air flow at the engine inlet 182. Limited air flow to the LP compressor 126 or the HP compressor 128 can adversely affect the performance of the three-stream engine 100 because the compressors 126, 128 are taxed with exerting additional power to provide the sufficient amount of compressed air to the combustor 130. Typically, the LP compressor 126 and the HP compressor 128 compress air more efficiently when more air is provided to the LP compressor 126 and the HP compressor 128 (e.g., from the engine inlet 182).

Disclosed herein are example methods and apparatus that enable retention of multiple fan blades on a collar. Disclosed collars enable simultaneous pitch control of multiple blades retained by the collar. The inclusion of additional fan blades on the collar provides additional air flow to the compressor sections of an associated aircraft engine. The collars include an opening to receive a first root of a first fan blade and one or more retention slots to retain second roots of second fan blades. As used herein, an "opening" is a hole or gap extending through a body and/or between two bodies. As used herein, a "slot" is an elongate aperture extending at least partially into a body. The collars include two mating pieces defining the opening and the retention slots to retain one or more second fan blades. As used herein, a "mating piece" is a part that has features, such as edges, protrusions, holes, and/or any other feature or combination of features, that physically complement another mating piece (e.g., another part with complementary features) to form a connection between the two mating pieces. In some examples, the collar includes fan blades integrally formed in the collar.

In some examples, the disclosed collars include force absorbing measures to mitigate the damaging effects of FOD hazards to a fan section of an associated aircraft engine. For example, disclosed examples provide an arrangement of springs or compressible material (e.g. crushable material, compressible insert, crushable insert) in and/or coupled to the collars to prevent damage to the fan blades, the collars, and other engine components. Additionally, the additional fan blades permitted by the disclosed collars can deflect, dislodge, divide, or otherwise expel FOD from the fan section. In some examples, additional fan blades can sever or cut FOD into smaller pieces that are less likely to block air flow at an engine inlet. As such, disclosed examples can improve the performance of compressor section by mitigating air flow blockage due to FOD at the engine inlet.

Figure 2:
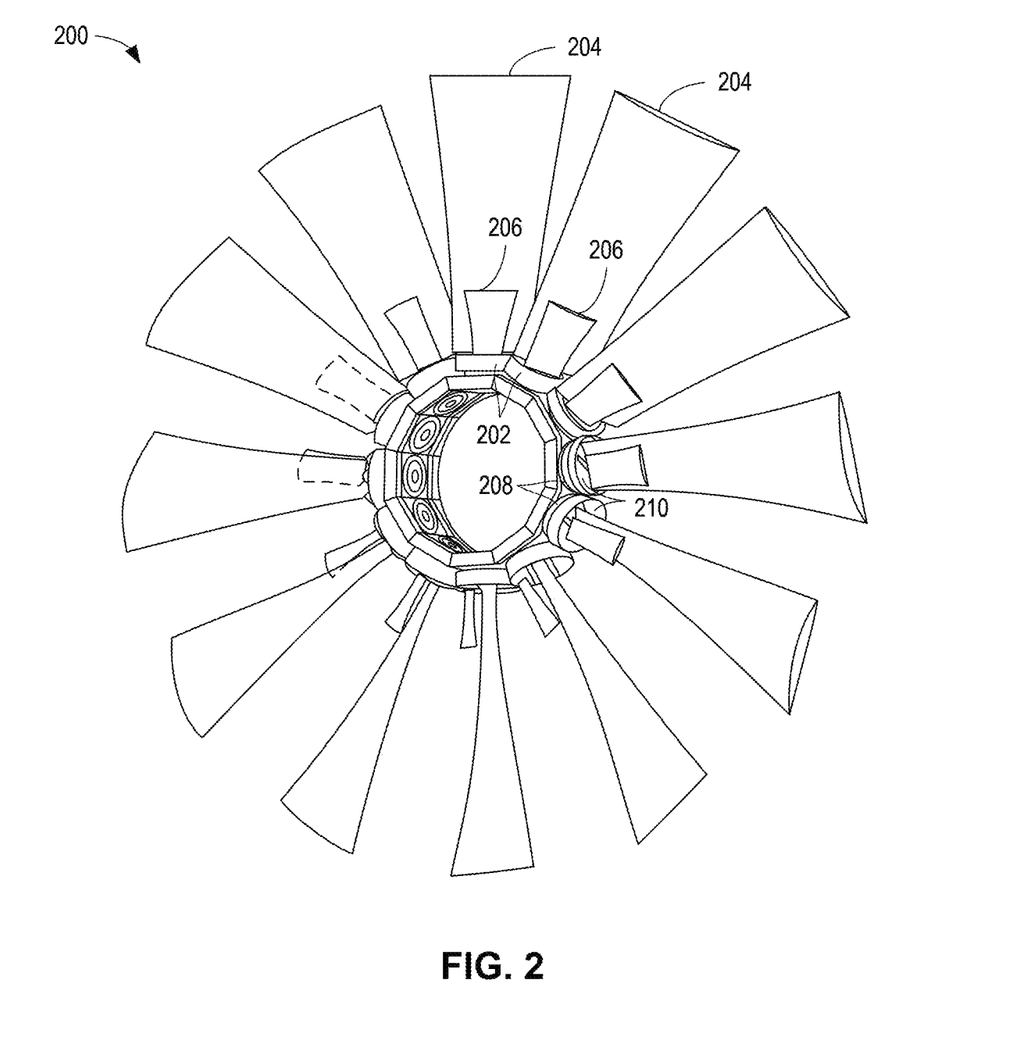
FIG. 2 is a portion of an example fan section constructed in accordance with teachings disclosed herein.

FIG. 2 is a portion of an example fan section 200. The fan section 200 includes trunnions 202, first fan blades 204 (e.g., primary fan blades, main fan blades, etc.), and second fan blades 206 (e.g., secondary fan blades, splitter blades, additional fan blades, etc.). The trunnions 202 include lower trunnion structures 208 and collars 210. The fan section 200 of FIG. 2 is similar to the fan section 150 of FIG. 1. However, the fan section 200 includes the second fan blades 206 coupled to corresponding ones of the trunnions 202.

The trunnions 202 are rotatable within a hub (e.g., the hub 149 of FIG. 1) of an aircraft engine (e.g., the three-stream engine 100 of FIG. 1). The first fan blades 204 can extend radially away from the hub. Further, the second fan blades 206 can extend radially away from the hub. As shown in FIG. 2, the second fan blades 206 are offset from the first fan blades 204. Each one of the trunnions 202 is coupled to one of the first fan blades 204 and one of the second fan blades 206. In particular, each one of the first fan blades 204 coupled to one of the lower trunnion structures 208 of the trunnions 202 and each one of the second fan blades 206 are coupled to one of the collars 210 of the trunnions 202. In other words, the first fan blades 204 are mounted to or within respective ones of the lower trunnion structures 208 and the second fan blades 206 are mounted to or within respective ones of the collars 210. The first fan blades 204 include first roots that are coupled to the respective ones of the lower trunnion structures 208. Further, the second fan blades 206 include second roots that are coupled to the respective ones of the collars 210. Each of the collars 210 include an opening (not shown in FIG. 2) to receive their respective first blade roots and retention slots (not shown in FIG. 2) to retain the second blade roots.

The second fan blades 206 have a different shape, size, position, etc., than the first fan blades 204. For example, the first fan blades 204 have a first root size and the second fan blades 206 have a second root size. The opening and the retention slots are sized according to the respective sizes of the first blade roots and the second blade roots.

Figure 3A:
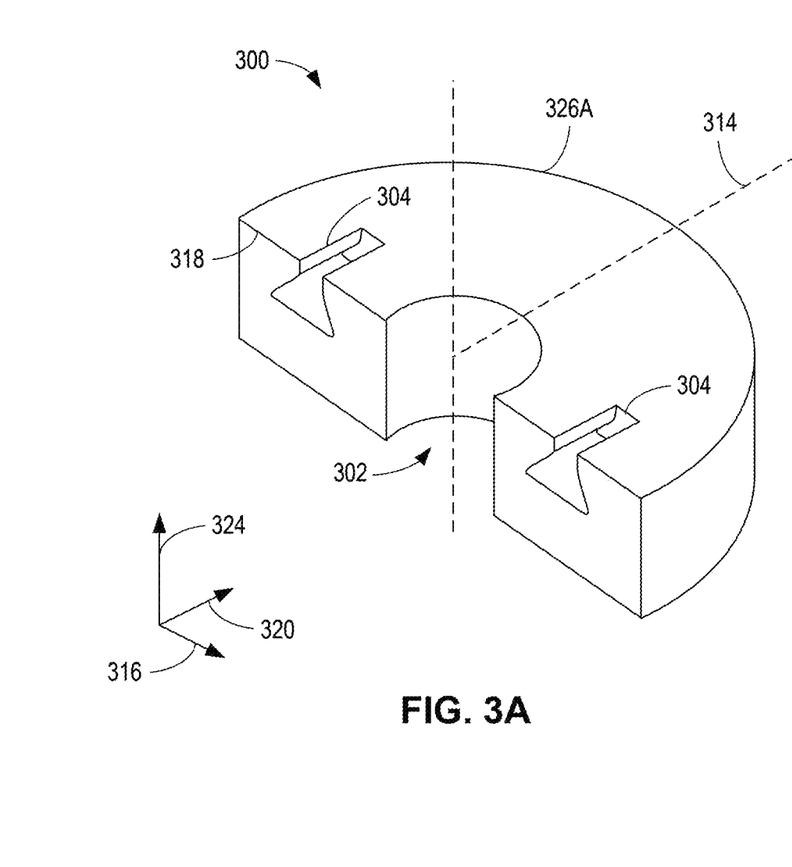
FIG. 3A is a perspective view of an example first collar of the fan section of FIG. 2 constructed in accordance with teachings disclosed herein.
Figure 3B:
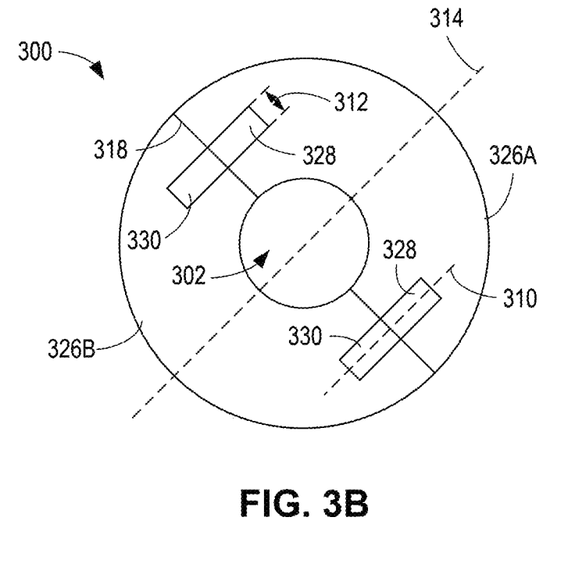
FIG. 3B is a top view of the example first collar of FIG. 3A constructed in accordance with teachings disclosed herein.
Figure 3C:
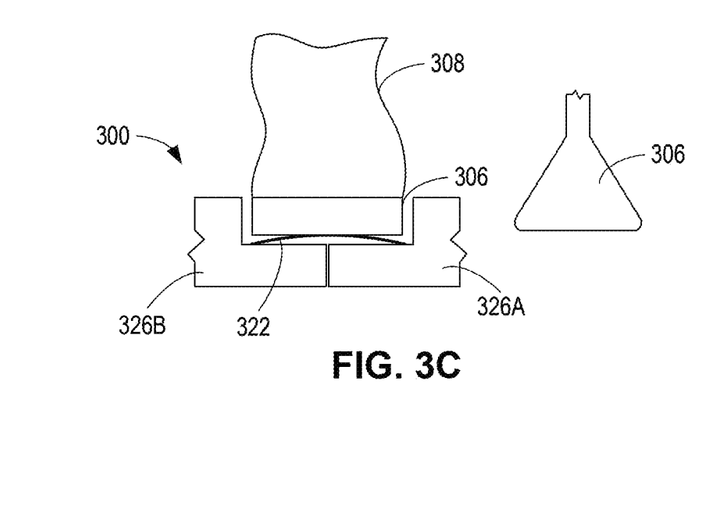
FIG. 3C is a cross-sectional view of a portion of the example first collar of FIG. 3A constructed in accordance with teachings disclosed herein.

FIGS. 3A-C show an example collar 300 that can be implemented in the fan section 200. The example described in connection with FIGS. 3A-C applies to all or any of the collars 210 of FIG. 2. The collar 300 includes an opening 302 and retention slots 304. The opening 302 retains a first root (not shown in FIGS. 3A-C but shown in FIG. 1) of a first fan blade (not shown in FIGS. 3A-C but shown in FIG. 2).

The retention slots 304 retain second roots 306 of second fan blades 308. Each retention slot 304 extends in an axial dimension along its an axial axis 310. The retention slots 304 have a width 312 (e.g., a thickness). The dimensions of the retention slots 304 are based on the dimensions of the second roots 306 of the second fan blades 308. In the illustrated example of FIGS. 3A-C, the retention slots 304 have a dovetail cross-sectional shape to receive dovetail blade roots. In other examples, the retention slots 304 have a different cross-sectional shape (e.g., a T-shape, a triangular shape, etc.). In some examples, a first one of the retention slots 304 has a first cross-sectional shape and a second one of the retention slots 304 has a second cross-sectional shape.

In the illustrated example of FIGS. 3A-C, the retention slots 304 are laterally offset from a centerline 314 of the collar 300 in a first lateral direction 316. In some examples, the retention slots 304 are laterally offset from each other and/or a split line 318 of the collar 300 in a second lateral direction 320. In some examples, the retention slots 304 are angularly offset from each other and/or the centerline 314. In the illustrated example of FIGS. 3A-C, the collar 300 includes two retention slots 304. In other examples, the collar 300 includes fewer (e.g., one) retention slots 304 or more (e.g., three, four, etc.) retention slots 304. The collar 300 includes a number of retention slots 304 equal to the number of second fan blades to be retained by the collar 300.

As shown in FIG. 3C, the first collar 300 includes springs 322 in the retention slots 304. In the illustrated example of FIG. 3C, the springs 322 are leaf springs. In other examples, another type of spring (e.g., a bimetallic spring, a coil spring, etc.) or a compressible material (e.g., a honeycomb structure, a room temperature vulcanizing (RTV) silicone, a washer, etc.) is included instead of the springs 322. The springs 322 provide mitigation of damage that can be caused by FOD impacting the second fan blades 308. More specifically, the spring 322 protects against damage caused by forces experienced at the juncture of the second fan blades 308 and the retention slots 304 in the vertical direction 324.

The first collar 300 includes a first mating piece 326A (e.g., a first member, a first portion of the first collar) and a second mating piece 326B. The first and second mating pieces 326A-B meet at the split line 318. The first and second mating pieces 326A-B define the opening 302 to receive the first fan blade. Thus, the first and second mating pieces 326A-B can be clam shelled around a first fan blade that is already coupled to an example lower trunnion structure.

The first mating piece 326A includes first portions 328 (e.g., first sections) of the retention slots 304 and the second mating piece 326B includes second portions 330 (e.g., second sections) of the retention slots 304. The first portions 328 and the second portions 330 extend from the split line 318 into the first mating piece 326A and the second mating piece 326B, respectively. When the first mating piece 326A and the second mating piece 326B clamshell around the first fan blade, the first portions 328 and the second portions 330 are aligned at the split line 318.

In the illustrated example of FIGS. 3A-C, each of the retention slots 304 have the first portions 328 in the first mating piece 326A and the second portions 330 in the second mating piece 326B. The first portions 328 and the second portions 330 are equally sized such that the middles of the second roots 306 are aligned with the split line 318. In other examples, the retention slots 304 are positioned and/or oriented differently.

In some examples, some or all of the retention slots 304 are entirely within one of the first mating piece 326A or the second mating piece 326B. In other words, at least one of the retention slots 304 is not split by the split line 318. In some examples, ones of the retention slots 304 of the first portions 328 are larger or smaller than ones of the retention slots 304 of the second portions 330. In the illustrated example of FIGS. 3A-C, the first portions 328 and the second portions 330 extend away from the split line 318 at an angle of approximately 90 degrees. Put another way, the first portions 328 and the second portions 330 are approximately parallel to the centerline 314. In some examples, ones of the retention slots 304 of the first portions 328 and/or ones of the second portions 330 are angled with respect to the centerline 314.

In the illustrated example of FIGS. 3A-C, the collar 300 includes two mating pieces 326A-B. In other examples, the collar 300 includes additional mating pieces 326. In the illustrated example of FIGS. 3A-C, each of the first and second mating pieces 326A-B are sized equally (e.g., each is half of the collar 300). In other examples, the mating pieces 326 are not sized equally. For instance, a collar 300 with three mating pieces 326 may include three equally sized mating pieces 326 (e.g., each is a third of the collar 300), three mating pieces 326 of three different sizes, or two equally sized mating pieces 326 and a third mating piece 326 of a different size (e.g., two mating pieces 326 are a quarter of the collar 300 each, and the third mating piece 326 is half of the collar 300).

The first mating piece 326A, the second mating piece 326B, and, more generally, the collar 300 can include a composite material (e.g., laminated plies, woven structures, thermoplastic material, etc.) or metallic material (e.g., stainless steel, aluminum, etc.). In some examples, the first mating piece 326A and the second mating piece 326B include a same material. In some examples, the first mating piece 326A includes a first material and the second mating piece 326B includes a second material different from the first material. In some examples, the first mating piece 326A, the second mating piece 326B, and, more generally, the collar 300 include the same material as a material of the first fan blade and/or the second fan blades 308.

Figure 4:
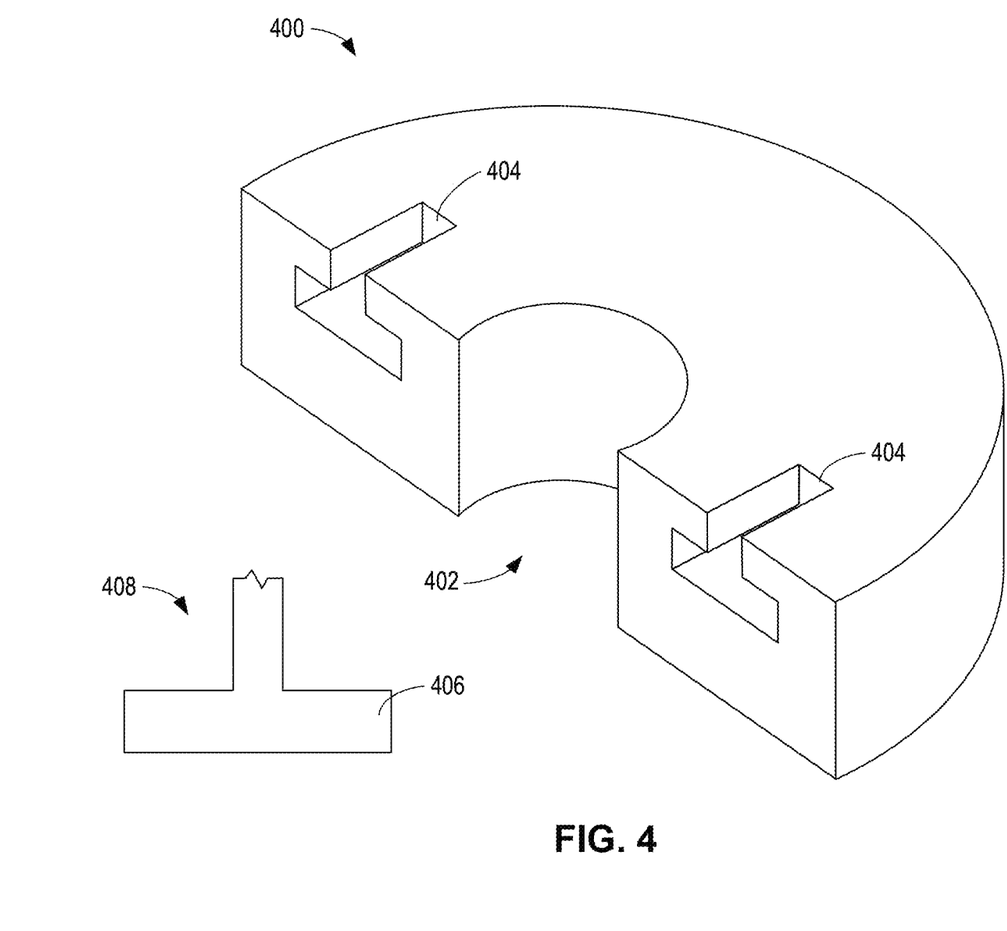
FIG. 4 is a perspective view of an example second collar of the fan section of FIG. 2 constructed in accordance with teachings disclosed herein.

FIG. 4 is another example collar 400 that can be implemented in the fan section 200. The example described in connection with FIG. 4 applies to all or any of the collars 210 of FIG. 2. The collar 400 is similar to the collar 300 of FIGS. 3A-C. For example, the collar 400 includes an opening 402 and two retention slots 404. However, the retention slots 404 of FIG. 4 have a T-shaped cross-sectional shape to receive second roots 406 of second fan blades 408 having a T-shaped cross-section.

Figure 5A:
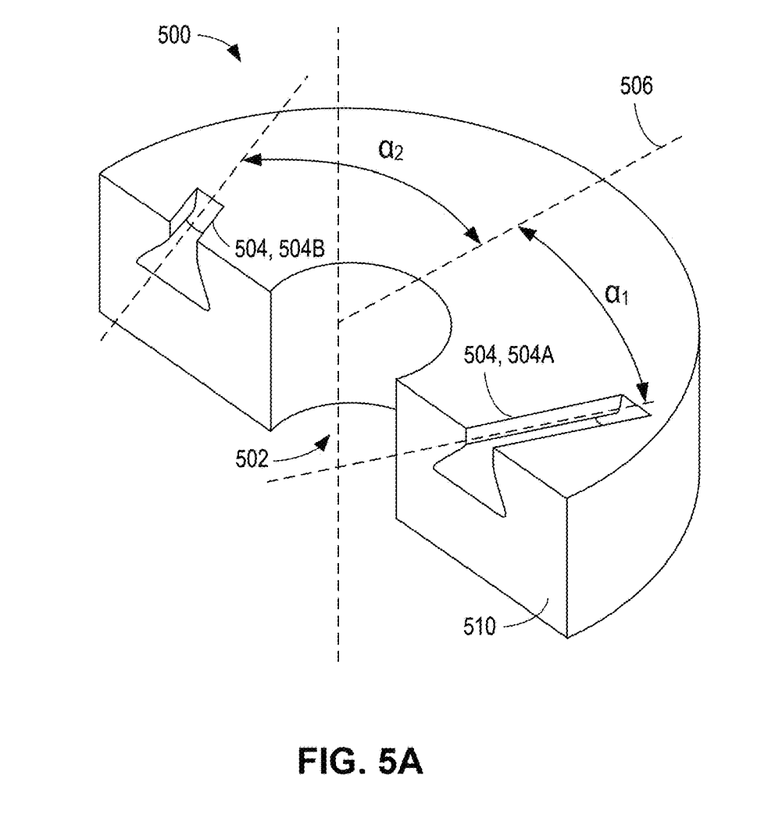
FIG. 5A is a perspective view of an example third collar of the fan section of FIG. 2 constructed in accordance with teachings disclosed herein.
Figure 5B:
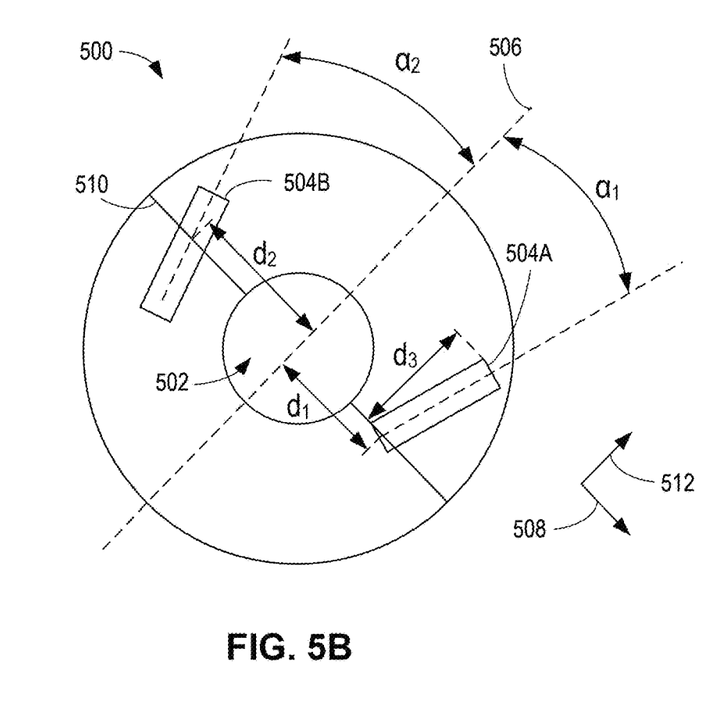
FIG. 5B is a top view of the example third collar of FIG. 5A constructed in accordance with teachings disclosed herein.

FIGS. 5A-B illustrate another example collar 500 that can be implemented in the fan section 200. The example described in connection with FIG. 5 applies to all or any of the collars 210 of FIG. 2. The collar 500 is similar to the collar 300 of FIGS. 3A-C. For example, the collar 500 includes an opening 502 and two retention slots 504. However, the positions and orientations of the retention slots 504 differ from those of the retention slots 304 in FIGS. 3A-C.

The first retention slot 504A and the second retention slot 504B are not evenly spaced apart from a centerline 506 of the collar 500. The first retention slot 504A is laterally offset from the centerline 506 in a first lateral direction 508 by a first distance $d_1$ and the second retention slot 504B is laterally offset from the centerline 506 in the first lateral direction 508 by a second distance $d_2$. In the illustrated example, the first distance $d_1$ is smaller (e.g., shorter) than the second distance $d_2$. In other examples, the first distance $d_1$ is larger than the second distance $d_2$.

In this example, the first retention slot 504A is also laterally offset from a split line 510 of the collar 500 in a second lateral direction 512 by a third distance $d_3$. The second retention slot 504B is not laterally offset from the split line 510 in the second lateral direction 512 (e.g., a middle of the second retention slot 504B is at the split line 510). In other examples, the second retention slot 504B is laterally offset from the split line 510 in the second lateral direction 512.

In the illustrated example of FIGS. 5A-B, the first retention slot 504A and the second retention slot 504B are angled with respect to the centerline 506. The first retention slot 504A forms a first angle $a_1$ with the centerline 506 and the second retention slot 504B forms a second angle $a_2$ with the centerline 506. In the illustrated example of FIGS. 5A-B, the second angle $a_2$ is bigger than the first angle $a_1$. In other examples, the first angle $d_1$ and the second angle $a_2$ are equal to each other. In other examples, the first angle $a_1$ is bigger and the second angle $a_2$.

Figure 6A:
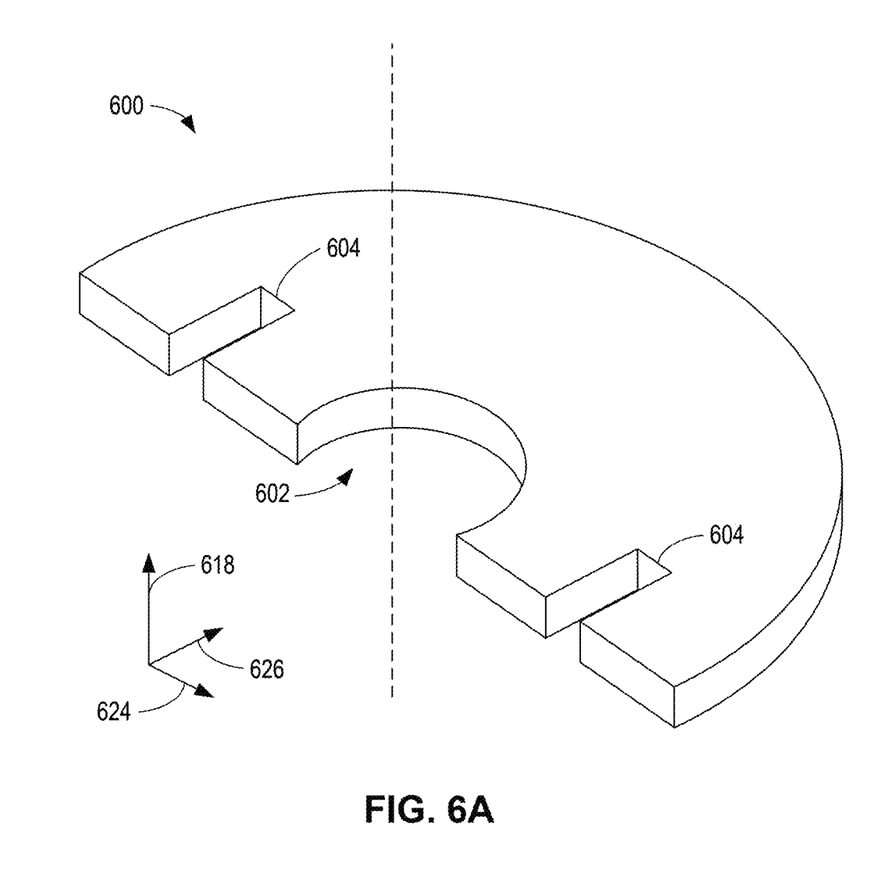
FIG. 6A is a perspective view of an example fourth collar of the fan section of FIG. 2 constructed in accordance with teachings disclosed herein.
Figure 6B:
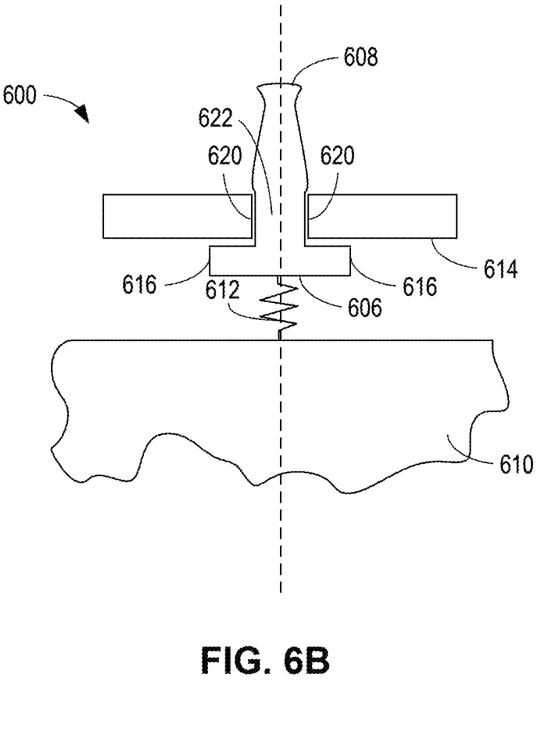
FIG. 6B is a front view of a portion of the example fourth collar of FIG. 6A constructed in accordance with teachings disclosed herein.

FIGS. 6A-B depict another example collar 600 that can be implemented in the fan section 200. The example described in connection with FIGS. 6A-B applies to all or any of the collars 210 of FIG. 2. The collar 600 is similar to the collar 300 of FIGS. 3A-C. For example, the collar 600 includes an opening 602 and two retention slots 604. However, the retention slots 604 do not fully enclose the second roots 606 of the second fan blades 608 like the collars 300, 400, and 500.

Instead, the second roots 606 are supported by a lower trunnion structure 610 via a spring 612. The second roots 606 have a T-shaped cross-section. A first surface 614 on a first side of the collar 600 interfaces with wings 616 of the second roots 606 to limit movement of the second fan blades 608 in a vertical direction 618. Second surfaces 620 of the retention slots 604 interface with a stem 622 of the second fan blades 608 to limit movement of the second fan blades 608 in a first lateral direction 624 and a second lateral direction 626. The coupling of the second roots 606 to the lower trunnion structure 610 limits movement of the second fan blades 608 in the vertical direction 618.

The spring 612 is a coil spring 612. In some examples, the spring 612 is another type of spring (e.g., a bimetallic spring, a leaf spring, etc.). Some examples include a compressible material (e.g., a honeycomb structure, an RTV silicone, a washer, etc.) in place of the spring 612. In some examples, the second fan blades 608 are directly coupled to the lower trunnion structure 610 (e.g., no spring 612 or compressible material is included between the second fan blades 608 and the lower trunnion structure 610).

Figure 7A:
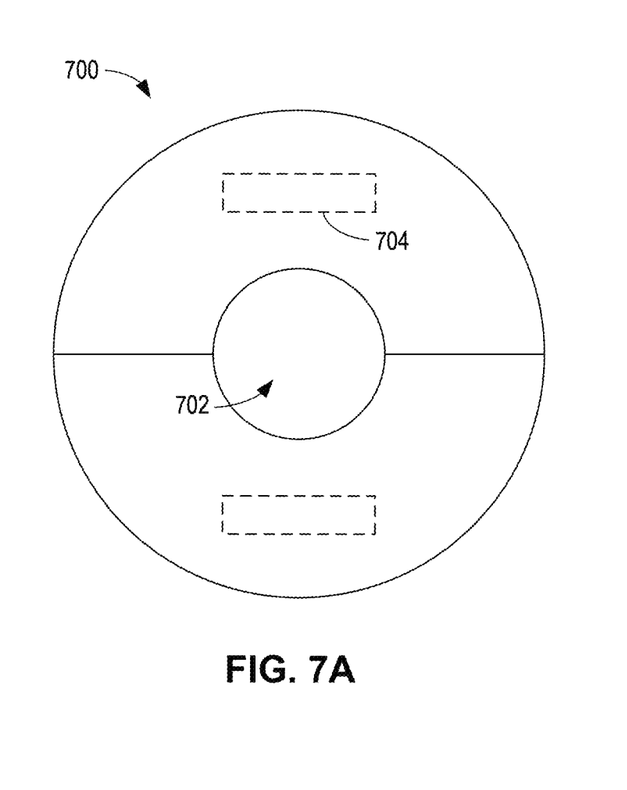
FIG. 7A is a top view of an example fifth collar of the fan section of FIG. 2 constructed in accordance with teachings disclosed herein.
Figure 7B:
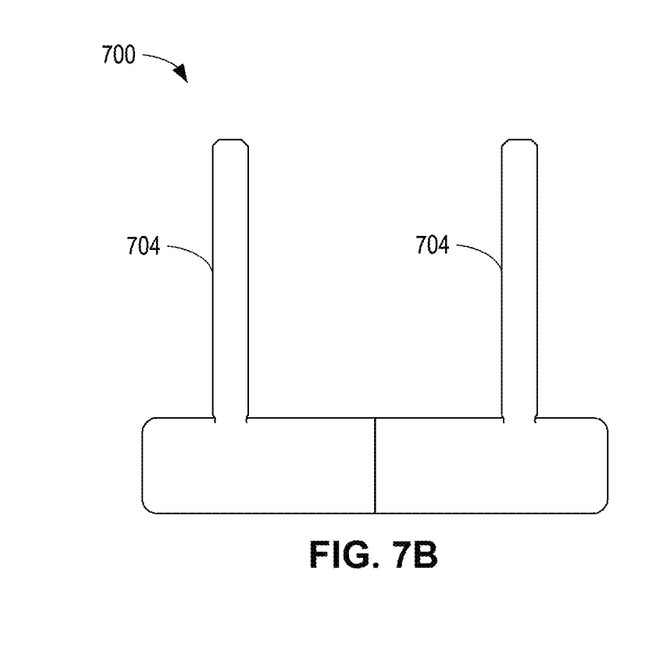
FIG. 7B is a front view of the example fifth collar of FIG. 7A constructed in accordance with teachings disclosed herein.

FIGS. 7A-B show another example collar 700 that can be implemented in the fan section 200. The example described in connection with FIGS. 7A-B applies to all or any of the collars 210 of FIG. 2. The collar 700 is similar to the collar 300 of FIGS. 3A-C. For example, the collar 700 includes an opening 702. However, the collar 700 does not include retention slots. Instead, the second fan blades 704 are integrally formed with the collar 700. By integrally forming the second fan blades 704 into the collar 700, some combinations of positions and/or orientations of the second fan blades 704 are more feasible. The collar 700 can be formed by additive manufacturing methods or by a composite lay-up process, for example. In some examples, the collar 700 is formed by subtractive manufacturing methods, such as milling, for example.

In some examples, the collar 700 includes retention slots, in addition to at least one integrally formed second fan blade 704, to retain third fan blades. In those examples, the retention slots are implemented as described above in connection with the retention slots 304, 404, 504, 604 of FIGS. 3A-6B.

Figure 8A:
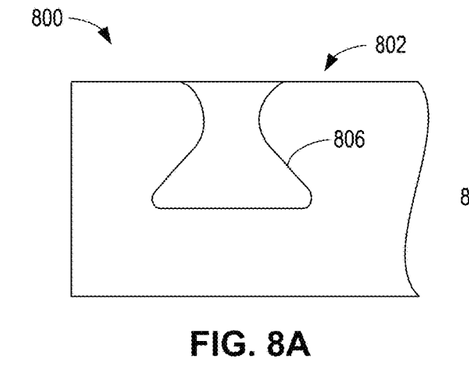
FIG. 8A is a radial cross-sectional view of an example first spring arrangement implemented in the example collars of FIGS. 3-7 constructed in accordance with teachings disclosed herein.
Figure 8B:
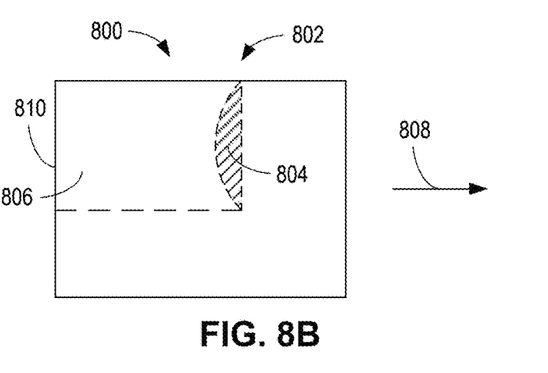
FIG. 8B is an axial cross-sectional view of the first spring arrangement of FIG. 8A constructed in accordance with teachings disclosed herein.

FIG. 8A is a radial cross-sectional view of an example collar 800 with a first spring arrangement 802. The first spring arrangement 802 can be implemented in the example collars 300, 400, 500, 600, 700 of FIGS. 3A-7B. FIG. 8B is an axial cross-sectional view of the first spring arrangement 802. The first spring arrangement 802 includes a first spring 804 (e.g., an axial spring) located at the at the axial end of a retention slot 806. The first spring 804 provides FOD resilience in a lateral direction 808 away from the split line 810, between the collar 800 and second fan blades (not shown in FIGS. 8A-F). Thus, damage that can occur from FOD forces in the lateral direction 808 is mitigated or prevented altogether.

Figure 8C:
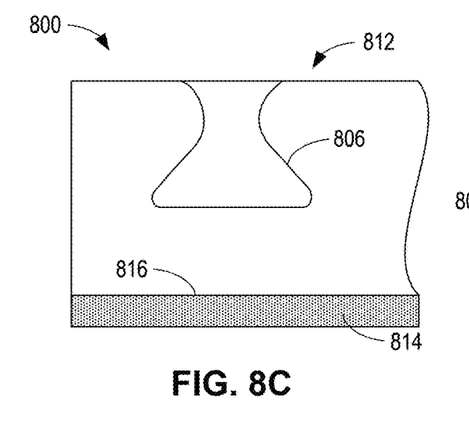
FIG. 8C is a radial cross-sectional view of an example second spring arrangement implemented in the example collars of FIGS. 3-7 constructed in accordance with teachings disclosed herein.
Figure 8D:
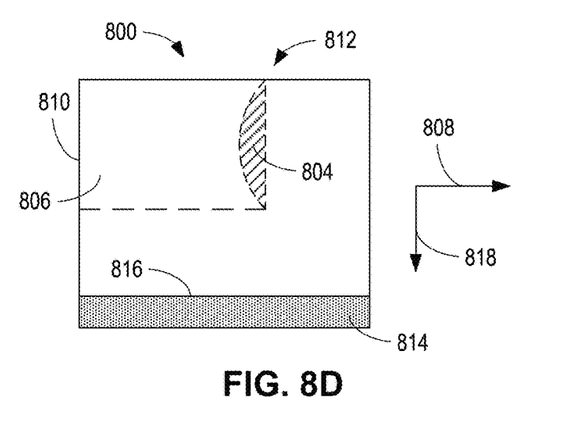
FIG. 8D is an axial cross-sectional view of the second spring arrangement of FIG. 8C constructed in accordance with teachings disclosed herein.

FIG. 8C is a radial cross-sectional view of the collar 800 with an example second spring arrangement 812 that can be implemented in the example collars 300, 400, 500, 600, 700 of FIGS. 3A-7B. FIG. 8D is an axial cross-sectional view of the second spring arrangement 812. The second spring arrangement 812 includes the first spring 804 and a second spring 814 (e.g., a collar radial spring) located adjacent a first surface 816 of the collar 800 facing a lower trunnion structure (not shown in FIGS. 8A-F). The second spring 814 provides FOD resilience in a vertical direction 818 between the collar 800 and the lower trunnion structure. Thus, damage caused by vertical FOD forces that may occur at the juncture between the lower trunnion structure and the collar 800 is mitigated or prevented altogether.

Figure 8E:
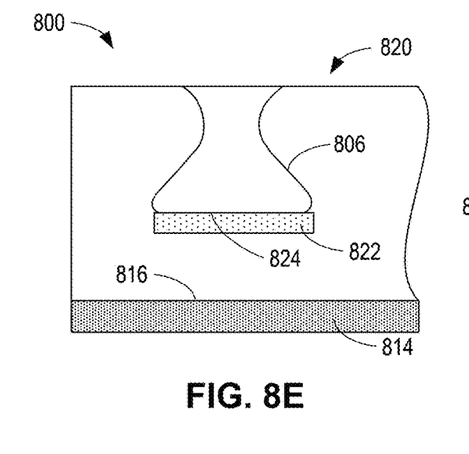
FIG. 8E is a radial cross-sectional view of an example third spring arrangement implemented in the example collars of FIGS. 3-7 constructed in accordance with teachings disclosed herein.
Figure 8F:
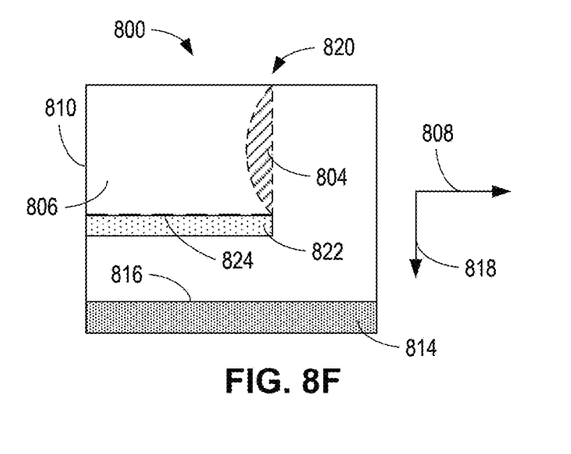
FIG. 8F is an axial cross-sectional view of the third spring arrangement of FIG. 8E constructed in accordance with teachings disclosed herein.

FIG. 8E is a radial cross-sectional view of the collar 800 with an example third spring arrangement 820 that can be implemented in the example collars 300, 400, 500, 600, 700 of FIGS. 3A-7B. FIG. 8F is an axial cross-sectional view of the third spring arrangement 820. The third spring arrangement 820 includes the first spring 804, the second spring 814, and a third spring 822 (e.g., a blade radial spring) located adjacent to a second surface 824 of the collar 800, the second surface 824 within the retention slot 806. The third spring 822 provides FOD resilience in the vertical direction 818 between the collar 800 and the second fan blades (not shown in FIGS. 8A-F). Thus, damage caused by vertical FOD forces that may occur at the juncture between the second fan blades and the collar 800 is mitigated or prevented altogether.

The example first, second, and third spring arrangements 802, 812, 820 are not exhaustive. It is to be appreciated that the collars disclosed herein may include any combination of springs and/or compressible materials in the axial, collar radial, and blade radial locations. For instance, a collar 300, 400, 500, 600, 700 may include a blade radial spring and a collar radial spring, but no axial spring. In some examples, any of the first, second, and third springs 804, 814, 822 are a compressible insert instead of a spring. Furthermore, while the collar 800 includes a dovetail-shaped retention slot, the first, second, and third spring arrangements 802, 812, 820 can be implemented in collars 800 including retention slots with different cross-sectional shapes.

Furthermore, while the first, second, and third spring arrangements 802, 812, 820 include the first, second, and third springs 804, 814, 822, other examples include a compressible material instead of at least one of the first, second, and third springs 804, 814, 822. For example, a collar may include the first and second springs 804, 814 and a compressible material adjacent to the bottom of the retention slot 806 in place of the third spring 822.

Figure 9A:
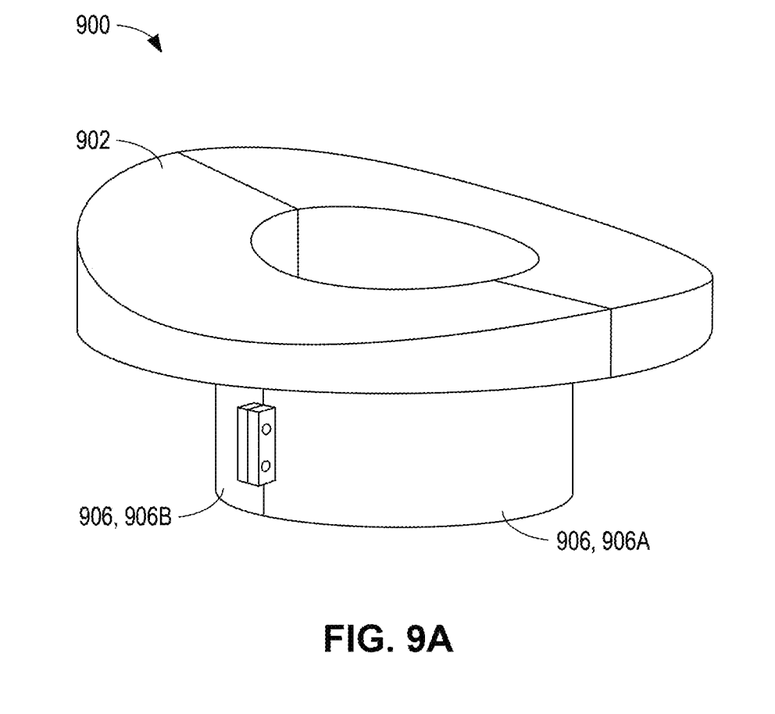
FIG. 9A is a perspective view of an example trunnion of the fan section of FIG. 2 constructed in accordance with teachings disclosed herein.
Figure 9B:
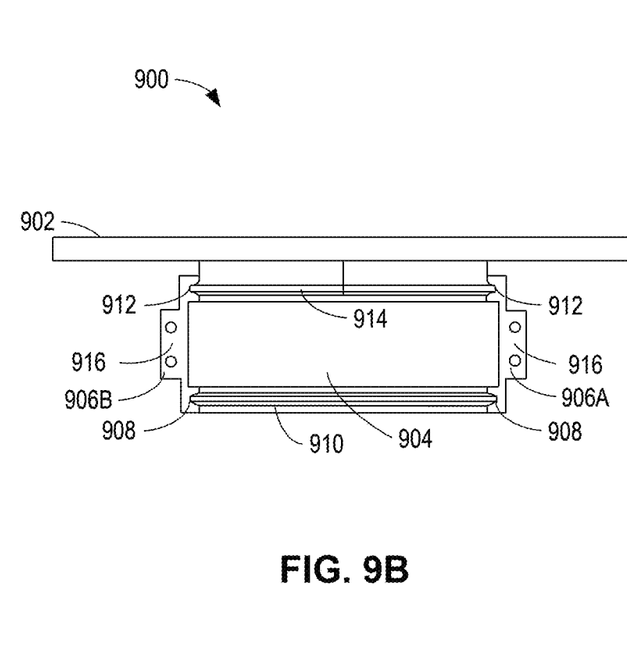
FIG. 9B is a cross-sectional view of the example trunnion of FIG. 9A.

FIGS. 9A-B show an example trunnion 900 of the fan section 200. The trunnion 900 can be implemented with the example collars 300, 400, 500, 600, 700 of FIGS. 3A-7B. The example described in connection with FIGS. 9A-B applies to all or any of the collars 210 of FIG. 2. The trunnion includes a collar 902, a lower trunnion structure 904, and a sleeve 906. The sleeve 906 includes a first member 906A and a second member 906B. Each of the first member 906A and the second member 906B include a first groove 908 (e.g., slot, notch, etc.) to receive a first ridge 910 (e.g., ledge) of the lower trunnion structure 904 and a second groove 912 to receive a second ridge 914 of the collar 902. The first member 906A and the second member 906B also include extrusions 916 to enable coupling of the first member 906A and the second member 906B.

The trunnion 900 is one example structural arrangement of the collar 902 and the lower trunnion structure 904. It will be appreciated that other structural arrangements are utilized in other examples (e.g., the collar 902 and the lower trunnion structure 904 are directly coupled, the collar 902 and the lower trunnion structure 904 are coupled via the first and second fan blades, etc.). The specific structural arrangement the collar 902 and the lower trunnion structure 904 does not affect the other aspects of the novel structures disclosed herein.

From the foregoing, it will be appreciated that example systems, apparatus, articles of manufacture, and methods have been disclosed that enable retention of multiple fan blades on a collar. In examples disclosed herein, the retention of additional fan blades on the respective collar provides additional air flow to the compressor sections of an associated aircraft engine. For example, the additional fan blades disclosed herein help to compress the incoming airflow to a subsequent compressor section. In turn, this increased air flow liberates a compressor section from needlessly expending power to generate enough compressed air for a subsequent combustor. As such, disclosed examples aid or improve the performance of a compressor section.

Further, disclosed examples can mitigate the damaging effects of FOD hazards to a fan section of an associated aircraft engine. For example, disclosed examples include force absorbing measures to mitigate damaging effects of FOD hazards at the blade roots. Furthermore, examples disclosed herein enable retention of additional fan blades to deflect, dislodge, divide, or otherwise expel FOD from the fan section. In some examples, additional fan blades disclosed herein can sever or cut FOD into smaller pieces that are less likely to block air flow at an engine inlet. As such, disclosed examples can improve the performance of compressor section by mitigating air flow blockage due to FOD at the engine inlet and mitigating damage to the fan blades, the collars, and other engine components.

Further disclosure is provided by the following clauses:

An example gas turbine engine includes a plurality of fan blades; and a collar coupled to the plurality of fan blades, the collar including: a first mating piece; and a second mating piece coupled to the first mating piece, the first and second mating pieces defining an opening configured to receive a first root of a first fan blade of the plurality of fan blades, and wherein the first and second mating pieces define a slot configured to retain a second root of a second fan blade of the plurality of fan blades.

The gas turbine engine of any preceding clause, further comprising a first spring or a first compressible insert disposed within the slot.

The gas turbine engine of any preceding clause, further comprising a second spring or a second compressible insert on surfaces of the first mating piece and the second mating piece, wherein the surfaces are defined adjacent to a lower trunnion structure.

The gas turbine engine of any preceding clause, further comprising a third spring or a third compressible insert in the slot, wherein the first spring or first compressible insert is configured to limit movement of the second root in an axial direction, and wherein the third spring or third compressible insert is configured to limit movement of the second root in a radial direction.

The gas turbine engine of any preceding clause, wherein the slot is a first slot, further including a second slot, the first slot forming a first angle with a centerline of the first mating piece, the second slot forming a second angle with the centerline of the first mating piece, the second angle different than the first angle.

The gas turbine engine of any preceding clause, wherein the slot is a first slot, wherein the first and second mating pieces further include a second slot, the first slot laterally offset from a centerline of the first mating piece by a first distance, the second slot laterally offset from the centerline of the first mating piece by a second distance, wherein the second distance is different than the first distance.

The gas turbine engine of any preceding clause, wherein the slot is a first slot and the first mating piece and the second mating piece are coupled at a split line, wherein the first mating piece and the second mating piece further include a second slot, the first slot laterally offset from the split line by a first distance, the second slot laterally offset from the split line of the first mating piece by a second distance, wherein the second distance is different than the first distance.

The gas turbine engine of any preceding clause, wherein the plurality of fan blades includes a third fan blade integrally formed into one of the first mating piece or the second mating piece.

An example gas turbine engine includes: a first fan blade; a second fan blade; and a collar coupled to the first fan blade and to the second fan blade, the collar defining: an opening configured to receive a first blade root of the first fan blade; and a slot configured to retain a second blade root of the second fan blade, wherein the slot is spaced apart from the opening.

The gas turbine engine of any preceding clause, wherein the collar further includes at least one of a spring or a compressible insert.

The gas turbine engine of any preceding clause, wherein the at least one of the spring or the compressible insert is at an end of the slot, a bottom of the slot, or underneath the collar.

The gas turbine engine of any preceding clause, wherein the collar includes a first portion and a second portion, wherein the first portion is coupled to the second portion.

The gas turbine engine of any preceding clause, wherein a first section of the slot is in the first portion of the collar and a second section of the slot is in the second portion of the collar, wherein the first section aligns with the second section when the first portion is coupled to the second portion.

The gas turbine engine of any preceding clause, wherein the slot is a first slot, the collar further including a second slot, wherein the second slot is in the second portion of the collar.

The apparatus of any preceding clause, wherein the second blade root has a cross-sectional shape that is one of a dovetail or a T-shape.

An example gas turbine engine includes: a lower trunnion structure; and a collar adjacent to the lower trunnion structure, the collar defining: an opening to receive a first blade root of a first fan blade; and a slot to retain a second blade root of a second fan blade, wherein the slot is spaced apart from the opening.

The gas turbine engine of any preceding clause, further including at least one spring or compressible insert at least partially disposed within the slot.

The gas turbine engine of any preceding clause, wherein one or more of the at least one spring or compressible insert is one of (1) an axial spring or compressible insert, (2) a blade radial spring or compressible insert, or (3) a collar radial spring or compressible insert.

The gas turbine engine of any preceding clause, wherein a first surface of the collar engages wings of the second blade root to limit movement of the second fan blade in a lateral direction.

The gas turbine engine of any preceding clause, wherein second surfaces of the slot engages a stem of the second blade root to limit movement of the second fan blade in a lateral direction.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. A gas turbine engine comprising:
 a plurality of fan blades; and
 a collar coupled to the plurality of fan blades, the collar including:
  a first mating piece; and
  a second mating piece coupled to the first mating piece, the first and second mating pieces defining an opening configured to receive a first root of a first fan blade of the plurality of fan blades, and wherein the first and second mating pieces define a slot configured to retain a second root of a second fan blade of the plurality of fan blades.

2. The gas turbine engine of claim 1, further comprising a first spring or a first compressible insert disposed within the slot.

3. The gas turbine engine of claim 2, further comprising a second spring or a second compressible insert on surfaces of the first mating piece and the second mating piece, wherein the surfaces are defined adjacent to a lower trunnion structure.

4. The gas turbine engine of claim 3, further comprising a third spring or a third compressible insert in the slot, wherein the first spring or first compressible insert is configured to limit movement of the second root in an axial direction, and wherein the third spring or third compressible insert is configured to limit movement of the second root in a radial direction.

5. The gas turbine engine of claim 1, wherein the slot is a first slot, further including a second slot, the first slot forming a first angle with a centerline of the first mating piece, the second slot forming a second angle with the centerline of the first mating piece, the second angle different than the first angle.

6. The gas turbine engine of claim 1, wherein the slot is a first slot, wherein the first and second mating pieces further include a second slot, the first slot laterally offset from a centerline of the first mating piece by a first distance, the second slot laterally offset from the centerline of the first mating piece by a second distance, wherein the second distance is different than the first distance.

7. The gas turbine engine of claim 1, wherein the slot is a first slot and the first mating piece and the second mating piece are coupled at a split line, wherein the first mating piece and the second mating piece further include a second slot, the first slot laterally offset from the split line by a first distance, the second slot laterally offset from the split line of the first mating piece by a second distance, wherein the second distance is different than the first distance.

8. The gas turbine engine of claim 1, wherein the plurality of fan blades includes a third fan blade integrally formed into one of the first mating piece or the second mating piece.

9. A gas turbine engine comprising:
a first fan blade;
a second fan blade; and
a collar coupled to the first fan blade and to the second fan blade, the collar defining:
an opening configured to receive a first blade root of the first fan blade; and
a slot configured to retain a second blade root of the second fan blade, wherein the slot is spaced apart from the opening.

10. The gas turbine engine of claim 9, wherein the collar further includes at least one of a spring or a compressible insert.

11. The gas turbine engine of claim 10, wherein the at least one of the spring or the compressible insert is at an end of the slot, a bottom of the slot, or underneath the collar.

12. The gas turbine engine of claim 9, wherein the collar includes a first portion and a second portion, wherein the first portion is coupled to the second portion.

13. The gas turbine engine of claim 12, wherein a first section of the slot is in the first portion of the collar and a second section of the slot is in the second portion of the collar, wherein the first section aligns with the second section when the first portion is coupled to the second portion.

14. The gas turbine engine of claim 13, wherein the slot is a first slot, the collar further including a second slot, wherein the second slot is in the second portion of the collar.

15. The gas turbine engine of claim 9, wherein the second blade root has a cross-sectional shape that is one of a dovetail or a T-shape.

16. A gas turbine engine comprising:
a lower trunnion structure; and
a collar adjacent to the lower trunnion structure, the collar defining:
an opening to receive a first blade root of a first fan blade; and
a slot to retain a second blade root of a second fan blade, wherein the slot is spaced apart from the opening.

17. The gas turbine engine of claim 16, further including at least one spring or compressible insert at least partially disposed within the slot.

18. The gas turbine engine of claim 17, wherein one or more of the at least one spring or compressible insert is one of (1) an axial spring or compressible insert, (2) a blade radial spring or compressible insert, or (3) a collar radial spring or compressible insert.

19. The gas turbine engine of claim 16, wherein a first surface of the collar engages wings of the second blade root to limit movement of the second fan blade in a lateral direction.

20. The gas turbine engine of claim 19, wherein second surfaces of the slot engages a stem of the second blade root to limit movement of the second fan blade in a lateral direction.

* * * * *